Nov. 17, 1931.  J. F. JECKERT  1,832,711
AMUSEMENT DEVICE
Filed Aug. 21, 1929   2 Sheets-Sheet 1
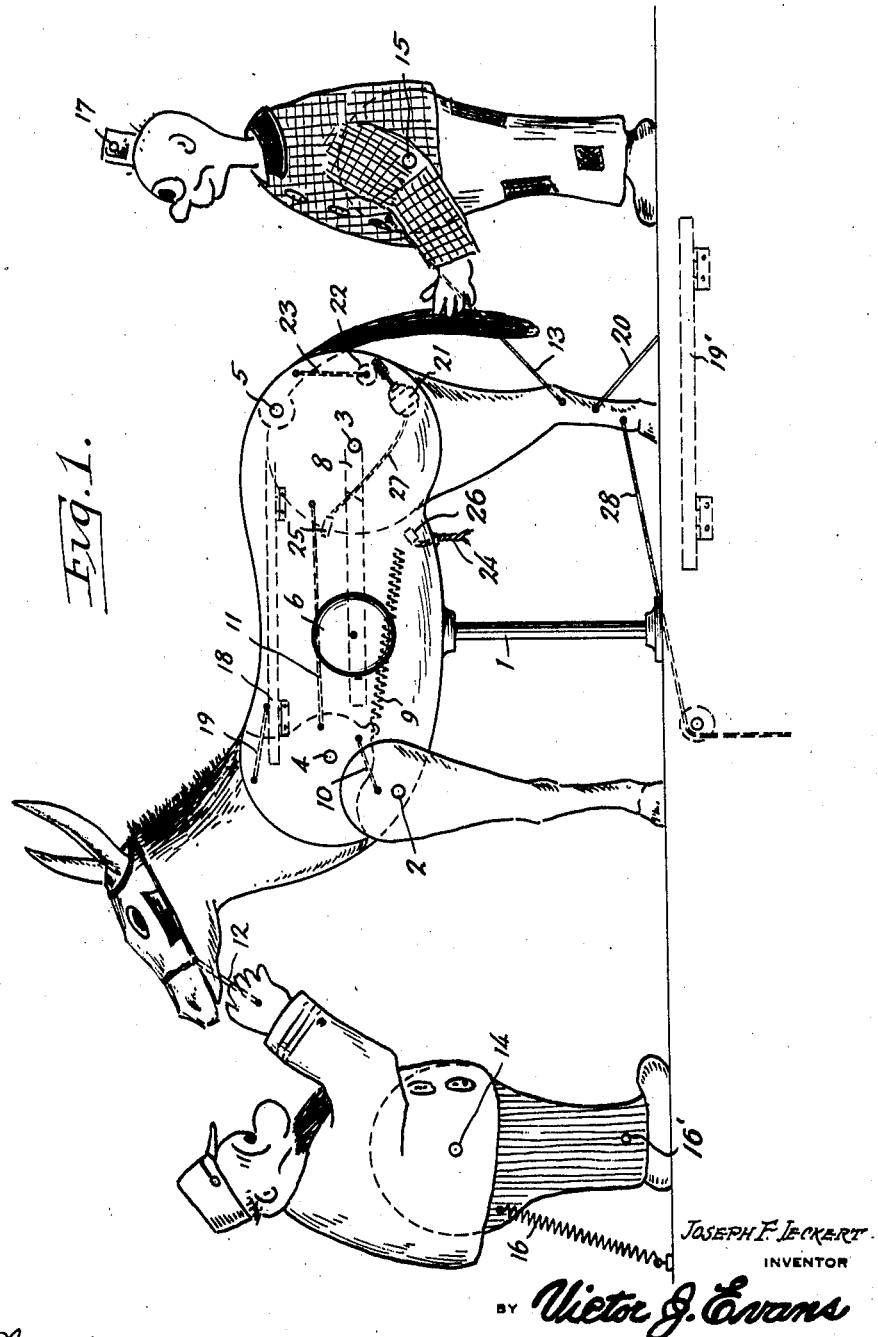

Nov. 17, 1931.  J. F. JECKERT  1,832,711
AMUSEMENT DEVICE
Filed Aug. 21, 1929   2 Sheets-Sheet 2
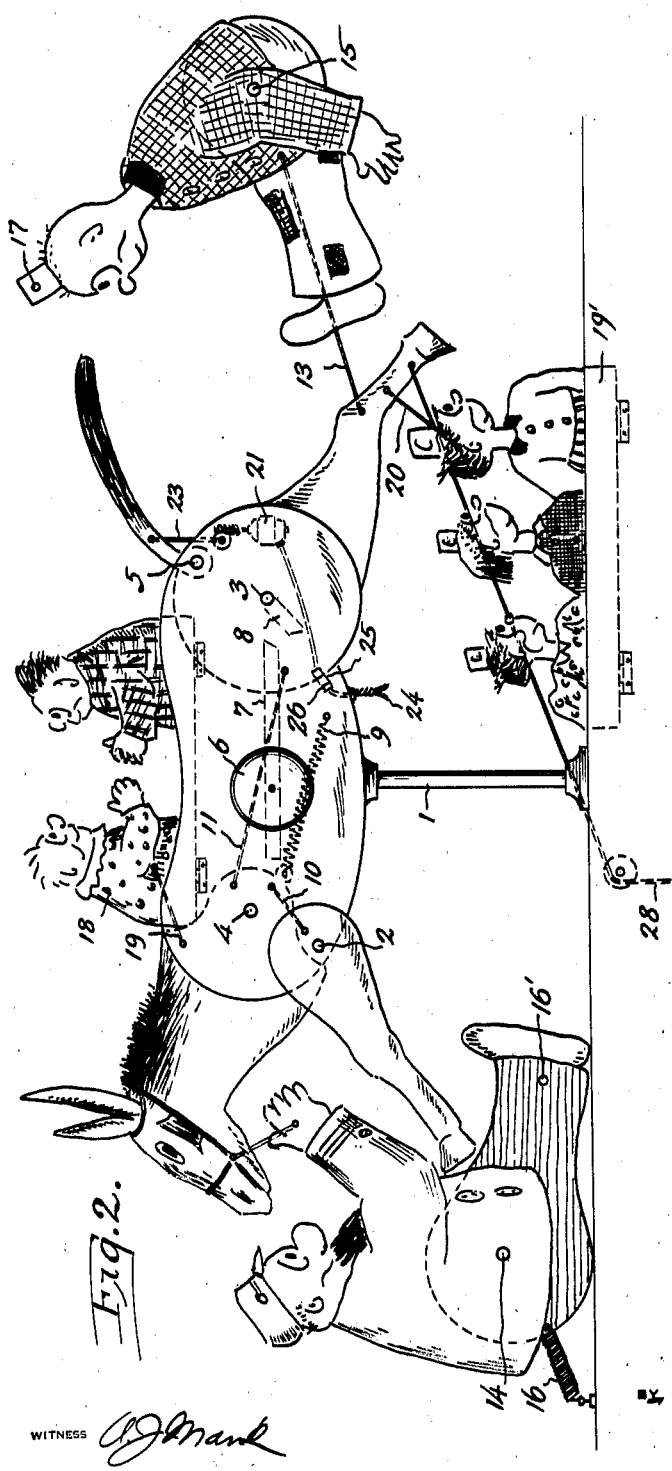
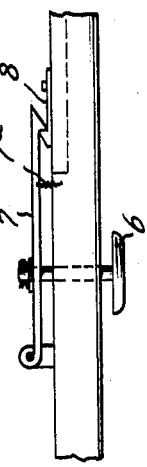
Joseph F. Jeckert
INVENTOR Patented Nov. 17, 1931

1,832,711

UNITED STATES PATENT OFFICE

JOSEPH F. JECKERT, OF CLIFTON, NEW JERSEY

AMUSEMENT DEVICE

Application filed August 21, 1929. Serial No. 387,490.

My invention relates to improvements in amusement devices, and particularly to those constructed as targets.

An object of my invention is to provide an amusement device, in which an animal capable of performing motions of its limbs, is combined in a group with comical characters, so that release of a latch causes a sudden change in the positions of the group.

Another object of my invention is to provide an amusement device in which a pleasure giving or mirth provoking effect is produced when a target is struck by a well aimed missile.

Still another object of my invention is to provide a novel form of target, adapted to develop and reward the skill of the operator.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show an embodiment of the invention as at present preferred.

In the accompanying drawings,

Fig. 1 is a side elevation of such embodiment showing the position of the various figures and the connecting linkage, in normal position.

Fig. 2 is a side elevation showing the position of the various figures and the connecting linkage, when the latch has been released, and;

Fig. 3 is a detail top plan view of the target and latch, on an enlarged scale.

Similar reference characters refer to similar parts throughout the several views.

Referring now to the drawings in detail:

An animal, represented in the preferred embodiment by a donkey, or a horse, is supported by a standard 1. The limbs of the animal are pivoted to the body as at 2 and 3, the neck pivoted as at 4, and the tail pivoted as at 5.

Preferably mounted in a central position on the body of the animal is a target 6, connected to a latch having a releasing catch 7 hinged to the body, a spring 7a maintaining the latch normally closed, and a part 8, coacting with the releasing catch, preferably secured to and carried by the pivoted hind leg.

This target 6 is, in the present case, desirably one such as to be depressed when struck by a properly aimed hand-thrown missile, such, for instance, as a base-ball.

A spring 9 has one end preferably anchored to the body of the animal and the other end connected to one of the pivoted members, preferably the neck, and is under tension in the normal position of the animal, as shown in Fig. 1.

A link 10 connects the neck with the front legs, as indicated, and another link 11 connects the hind legs with the neck portion, the connections being so arranged that as the neck portion moves downward, the front legs move forward and the hind legs backward, into approximately horizontal positions, as shown in Fig. 2.

Located preferably at the head and tail of the animal are comical figures, preferably well known comic supplement characters, linked to the animal by connections 12 and 13. The legs of the respective figures are pivotally connected to the body portions, as shown at 14 and 15. A spring 16 may be connected to the figure at the head of the animal, tending to draw it to a sitting position; this figure being fixedly pivoted at 16'. Similarly a single fixed pivot 17 is provided for the figure at the tail of the animal, this figure by the mere weight of its parts, tending to the upright position, shown in Figure 1.

Hinged to the upper part of the body of the animal, is a lateral member 18, carrying comical figures, preferably a group usually associated in the comic supplements with the previously mentioned comical characters, the group being preferably so arranged as to be invisible when the animal is in the normal position, as shown in Fig. 1, and to become visible upon movement of the pivoted members, by means of a link 19, connecting the hinged group to the neck portion.

There is also included another lateral member 19, hinged to a side wall of an opening in the floor adjacent to the animal, the lateral member 19 also carrying a group of comical figures preferably usually associated with one or more of the previously mentioned comical figures, this group being preferably also arranged so as to be invisible when the animal is in the normal position, as shown in Fig. 1, and to become visible upon movement of the pivoted members, by means of a link 20, connecting this hinged group to the hind legs.

As an additional feature there is provided means for moving the tail of the animal, comprising an electric motor 21, a speed reduction unit 22, shown as a worm and worm wheel, preferably mounted on the hind legs of the animal, and a link 23 connected to the worm wheel and the tail in a manner to produce a reciprocating action of the tail when the motor is operating. The wiring and switches for the motor may consist of lead in wires 24, stationary contacts 26, fixed to the body of the animal, and moving contacts 25, fixed to the pivoted hind legs and connected to the motor by wires 27, the contacts being separated when the group comprising the embodiment of my invention is in the normal position, as shown in Fig. 1.

A cord 28, for returning my device to normal position, is connected to the hind legs and by means of appropriate pulleys, is guided to a point within the attendant's reach.

The operation of the device is obvious from the foregoing description. When target 6 is struck by a well aimed missile, latch 7 is moved, against the resistance of its spring 7a, thus releasing the movable portion 8 of the latch. Spring 9 is thus freed and contracts quickly, causing the head of the animal to drop suddenly, this motion in turn causing the front and hind legs to simulate the motion of a violent kick. At the same time the figure at the head of the animal is seated violently upon the floor, the figure at the tail of the animal kicked into the air, the two hinged groups of figures appear, and the tail commences to move back and forth. The movement of the tail continues until the parts of the group are returned to their normal positions, by a pull on cord 28. The latch unit 7—8 will then retain them in this position until the target 6 is again struck.

The hereinbefore described construction admits of considerable modifications without departing from the invention; therefore, I do not wish to be limited to the precise arrangements shown and described, which are, as aforesaid, by way of illustration merely.

In other words, the scope of protection contemplated is to be taken solely from the appended claims, interpreted as broadly as is consistent with the prior art.

What I claim as new is:

1. In an amusement device, in combination, a figure having a pivotally mounted neck and pivotally mounted limbs, other figures connected to some of the pivoted portions of the first figure, normally concealed figures hinged on said body and linked to said neck, means for actuating the pivoted portions of the first figure and for concurrently bringing the normally concealed figures into view.

2. An amusement device composed of a group, comprising in combination, a support, a figure having pivotally mounted members mounted thereon, other figures connected to the first figure, normally concealed figures mounted on said first figure, means for actuating the group, means for releasing said actuating means to cause the first figure to apparently kick one of said other figures and to concurrently bring the normally concealed figures into view.

3. The mechanism defined in claim 2 in which the means for releasing the actuating means is a target.

4. An amusement device composed of a group comprising, in combination, a support, an animal having pivotally mounted members and a pivotally mounted tail mounted thereon, figures connected to the animal, figures mounted in normally concealed position behind the group, means for actuating the group, means for releasing said actuating means, and means for wagging the tail after the group has been actuated.

5. The mechanism defined in claim 4 wherein means are included for returning the group to normal position.

6. An amusement device composed of a group comprising, in combination, a support, an animal having pivotally mounted members and a pivotally mounted tail mounted thereon, figures connected to the animal, figures mounted in normally concealed position behind the group, means for actuating the group, means for releasing said actuating means, means for wagging the tail after the group has assumed its actuated position and means for returning the group to normal position.

7. An amusement device composed of a group, comprising, in combination, a support, an animal having a pivoted neck, pivoted limbs and a pivoted tail mounted thereon, figures connected to the pivoted members of the animal, a group of figures mounted in normally concealed position on the back of the animal and linked to said pivoted neck, another group of figures mounted in normally concealed position below the floor, adjacent to the animal and linked to one of said limbs, means for actuating the group, target operated means for releasing said actuating means, means for wagging the tail after the group has assumed its actuated position and means for returning the group to normal position.

In testimony whereof I hereby affix my signature.

JOSEPH F. JECKERT.